United States Patent
Jiang et al.

(10) Patent No.: US 10,903,657 B2
(45) Date of Patent: Jan. 26, 2021

(54) METHOD AND APPARATUS FOR CONTROLLING ALTERNATING CURRENT CASCADE PHOTOVOLTAIC POWER GENERATION SYSTEM

(71) Applicant: SUNGROW POWER SUPPLY CO., LTD., Anhui (CN)

(72) Inventors: Cai Jiang, Anhui (CN); Xinyu Wang, Anhui (CN); Jun Xu, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 206 days.

(21) Appl. No.: 16/114,404

(22) Filed: Aug. 28, 2018

(65) Prior Publication Data
US 2019/0165581 A1 May 30, 2019

(30) Foreign Application Priority Data

Nov. 28, 2017 (CN) .......................... 2017 1 1214418

(51) Int. Cl.
*H02J 3/38* (2006.01)
*G05F 1/67* (2006.01)

(52) U.S. Cl.
CPC ............. *H02J 3/385* (2013.01); *G05F 1/67* (2013.01); *Y02E 10/56* (2013.01)

(58) Field of Classification Search
CPC .......... H02J 3/385; G05F 1/67; Y02E 10/563; Y02E 10/58
See application file for complete search history.

(56) References Cited

U.S. PATENT DOCUMENTS 10,205,403 B2    2/2019  Xu et al.
2013/0106196 A1* 5/2013  Johnson ............... H02J 3/383
                                                      307/82

(Continued)

FOREIGN PATENT DOCUMENTS

CN    105720857 A    6/2016
CN    105790302 A    7/2016

(Continued)

OTHER PUBLICATIONS

Fusheng, Wang et al.; "A Hybrid Control Scheme of Cascaded H-Bridge Inverters for Grid-Connection Photovoltaic Systems," Transactions of China Electrotechnical Society; vol. 31, Sup. 1; Jan. 31, 2016; pp. 137-145.

*Primary Examiner* — Carlos Amaya
(74) *Attorney, Agent, or Firm* — Harness, Dickey & Pierce, P.L.C.

(57) ABSTRACT

A method for controlling an alternating current cascade photovoltaic power generation system is provided, which includes: acquiring, by a master controller, a current total output power of the system; determining, by the master controller, whether the total power value is greater than a preset power value; generating, by the master controller, a first control signal if the total power value is greater than the preset power value; generating, by the master controller, a second control signal if the total power value is smaller than or equal to the preset power value; receiving, by the slave controller, the first or second control signal generated by the master controller; and controlling, by the slave controller based on the first control signal, a cascade unit to independently perform an MPPT operation, or controlling, by the slave controller based on the second control signal, the cascade unit to output power.

18 Claims, 9 Drawing Sheets

(56) References Cited

U.S. PATENT DOCUMENTS

2015/0340964 A1  11/2015  Modeer
2017/0294875 A1  10/2017  Xu et al.
2017/0310239 A1  10/2017  Xu et al.

FOREIGN PATENT DOCUMENTS

| CN | 105827130 A | 8/2016 |
| CN | 106356886 A | 1/2017 |
| CN | 106451560 A | 2/2017 |
| CN | 106992554 A | 7/2017 |

* cited by examiner

METHOD AND APPARATUS FOR CONTROLLING ALTERNATING CURRENT CASCADE PHOTOVOLTAIC POWER GENERATION SYSTEM

CROSS REFERENCE TO RELATED APPLICATION

The present application claims priority to Chinese Patent Application No. 201711214418.2, titled "METHOD AND APPARATUS FOR CONTROLLING ALTERNATING CURRENT CASCADE PHOTOVOLTAIC POWER GENERATION SYSTEM", filed on Nov. 28, 2017 with the State Intellectual Property Office of People's Republic of China, which is incorporated herein by reference in its entirety.

FIELD

The present disclosure relates to the technical field of alternating current cascade system control, and in particular to a method and an apparatus for controlling an alternating current cascade photovoltaic power generation system.

BACKGROUND

Alternating current (AC) cascade systems are widely used for electric energy conversion, high voltage inverter, high voltage direct current transmission and the like. Generally, a single-phase full-bridge or half-bridge topology is used as a core power electronic topology circuit of a cascade unit, and an AC cascade system is formed by connecting multiple cascade units in series.

Taking a single-phase AC cascade system applied to the field of photovoltaic power generation as an example, as shown in FIG. 9, a schematic structural diagram of a traditional voltage source type cascade system is shown. In FIG. 9, the cascade system includes photovoltaic (PV) cell panels, cascade units, a filter and a load device. The PV cell panel may be a single cell panel, or may include multiple cell panels connected in series or in parallel. The cascade unit may be any apparatus or device capable of converting direct current into alternating current, such as a full-bridge two-level topology, a full-bridge three-level topology and a half-bridge three-level topology. An output terminal of the cascade unit may be or may not be connected with a filter unit either in series or in parallel according to an application occasion. That is, the output terminal of the cascade unit may be or may not be connected with the filter unit, and the filter unit may be an active filter or a passive filter. An AC series output terminal of the cascade unit may be or may not be connected with a filter unit either in series or in parallel according to an application occasion of the cascade system. That is, the AC series output terminal of the cascade unit may be or may not be connected with the filtering unit, and the filtering unit may be an active filter or a passive filter. Finally, the AC output terminal of the cascade system is connected to the load device, which may be a device or an apparatus such as a passive or active load, and a power grid. PV_n+ and PV_n– respectively represent a positive terminal and a negative terminal of a DC connection provided by the n-th PV cell panel, $V_{PVn}$ represents a voltage, and $P_{PVn}$ represents a power. $A_n$ and $B_n$ represent output terminals of the n-th cascade unit, $V_{ABn}$ represents a root-mean-square (RMS) of a fundamental voltage, and $P_{ABn}$ represents a power. A and B represent output terminals of the cascade system, $V_{AB}$ represents an RMS of a fundamental voltage, and $P_{AB}$ represents a power. L and N represent terminals of the load device, $V_{LN}$ represents an RMS of a fundamental voltage, and $P_{LN}$ represents a power. It can be seen from a terminal waveform that, the voltage $V_{PVn}$ of the output terminal of the DC source is a DC voltage, the voltage $V_{ABn}$ of the output terminal of the cascade unit may be a multi-level PWM AC voltage, or may be an AC voltage which is obtained by processing the multi-level PWM AC voltage by the filter. The voltage $V_{AB}$ of the output terminal of the cascade system is a multi-level PWM AC voltage, or may be an AC voltage which is obtained by processing the multi-level PWM AC voltage by the filter. The voltage $V_{LN}$ between terminals of the load device has a standard sine wave, or an approximate standard sine wave.

In a case where the AC cascade system is applied to the field of photovoltaic power generation, the DC source is a photovoltaic (PV) cell panel. In order to meet a maximum power output requirement of the cascade system, it is required that each cascade unit operates at a maximum power point (MPP), and in a case where the maximum power point of the photovoltaic cell panel changes, the cascade unit is capable of quickly tracking the MPP to achieve a maximum power point tracking (MPPT) function. In addition, for a system in which the cascade units are arranged far away from each other, a microprocessor for collecting signals such as a voltage and a current on a load side is generally provided, which is called a master controller. Each of the cascade units is provided with one or more microprocessors which are called slave controllers. The controllers exchange data and information through a communication bus. The communication bus may be, and is not limited to, the CAN communication, the 485 communication, a wireless communication, a power line carrier communication and an optical fiber communication.

Generally, the voltage $V_{LN}$ between the terminals of the load device may be approximated as a stable sinusoidal voltage. Since the AC cascade system includes a large number of cascade units, the cascade output voltage $V_{AB}$ of the AC cascade system may be approximated as a sinusoidal voltage. In addition, for a fundamental voltage, the subsequent filter may be ignored. Therefore, it may be considered that the cascade output voltage $V_{AB}$ is equal to the voltage $V_{LN}$ between the terminals of the load device, the power $P_{AB}$ is equal to the power $P_{LN}$, and the voltage is constant. It may be considered that the input power $P_{PVn}$ of the cascade unit is equal to the output power $P_{ABn}$, in a case where a self-power loss of the cascade unit is ignored. In addition, in order to simplify the control scheme of the system, the AC output voltages of the cascade units are usually controlled to be in the same phase and with the same frequency.

In a case where the AC cascade system operates normally, the AC output voltages of the cascade units have the same frequency and the same phase, and the AC output currents are the same, which may be expressed by:

$$\begin{cases} \sum_{i=1}^{n} P_{PVi} = \sum_{i=1}^{n} P_{ABi} = P_{AB} = P_{LN} \\ \sum_{i=1}^{n} V_{ABi} = V_{AB} = V_{LN} \\ \dfrac{V_{ABn}}{V_{LN}} = \dfrac{V_{ABn}}{V_{AB}} = \dfrac{P_{ABi}}{P_{AB}} = \dfrac{P_{PVn}}{P_{LN}} \end{cases}$$

It can be seen that an RMS $V_{ABn}$ of a fundamental wave of the output voltage of each cascade unit is directly determined by the input power $P_{PVn}$ of the cascade unit, the total output power $P_{LN}$ of the system and the RMS $V_{LN}$ of the voltage between the terminals of the load device. The RMS $V_{ABK}$ of the fundamental wave of the AC output voltage of the k-th cascade unit may be expressed by:

$$V_{ABk} = V_{LN}\frac{P_{PVK}}{P_{LN}} = \frac{V_{LN}}{\frac{P_{PV1}}{P_{PVk}} + \cdots + 1 + \cdots + \frac{P_{PVn}}{P_{PVk}}}$$

A large input power $P_{PVk}$ of the cascade unit may lead to a large RMS $V_{ABk}$ of the fundamental wave of the AC output voltage.

A modulation degree $m_n$ of the cascade unit is defined by:

$$m_n = \frac{V_{ABn}}{V_{PVn}}$$

It can be seen from the definition of the modulation degree that, the modulation degree ranges from 0 to 1. In a case where the output voltage of the cascade unit is 0, the modulation degree is a minimum value of 0. In a case where the cascade unit adopts square wave modulation of full duty cycle, the modulation degree is a maximum value of 1.

However, since there are differences among photovoltaic cell panels, it can be known from a theoretical derivation that modulation values of one or more cascade units may exceed the maximum value, which results in an abnormal operation of the system.

In addition, in order to make the cascade system operate normally, it is required to obtain the input powers of the other cascade units to calculate the modulation degree of each cascade unit. In the AC cascade system applied to the photovoltaic field, the cascade unit may operate in an over-modulation operating condition that the modulation degree exceeds the maximum modulation degree with a high probability, in a case where the system is operating at start time when the output power of the photovoltaic cell panel changes drastically.

At present, a method for starting MPPT of a cascade H-bridge photovoltaic grid-connected inverter is provided. In this method, a voltage outer loop instruction on the PV side of each cascade unit at the time of system startup is 0.8 times of an open circuit voltage of the photovoltaic cell panel. With this method, each photovoltaic cell panel can be controlled to operate with a power close to the maximum power point at the time of system startup. However, in a case where there is a serious imbalance among the powers of the photovoltaic panels, it is still impossible to avoid that one or more of the cascade units operate under the over-modulation operating condition. In addition, in a case where input power values on the DC-side of the cascade units cannot be exchanged between the AC cascade units in time, an instability problem of the system such as AC output current oscillation is caused easily due to mismatch between a control input variable and a feedback variable of the system.

Therefore, an urgent issue to be solved is how to solve a problem that the cascade unit may operate in the over-modulation operating condition during an operation of the AC cascade system, so as to ensure a normal, reliable and stable operation of the system.

SUMMARY

In view of this, a method for controlling an alternating current (AC) cascade photovoltaic (PV) power generation system is provided according to the present disclosure. With the method, the problem that the cascade unit may operate in an over-modulation operating condition during the operation of the AC cascade photovoltaic power generation system can be solved, thereby ensuring a normal, reliable and stable operation of the system.

A method for controlling an AC cascade photovoltaic power generation system is provided according to the present disclosure. The method is applied to a control device of an AC cascade photovoltaic power generation system. The control device of the AC cascade photovoltaic power generation system includes a master controller and a slave controller. The method includes:

acquiring, by the master controller, a current total output power of the AC cascade photovoltaic power generation system;

determining, by the master controller, whether the total power value is greater than a preset power value, generating, by the master controller, a first control signal if the total power value is greater than the preset power value, and generating, by the master controller, a second control signal if the total power value is smaller than or equal to the preset power value;

receiving, by the slave controller, the first control signal or the second control signal generated by the master controller; and controlling, by the slave controller based on the first control signal, a cascade unit connected to the slave controller to independently perform a maximum power point tracking (MPPT) operation, or controlling, by the slave controller based on the second control signal, the cascade unit connected to the slave controller to output power.

In an embodiment, the controlling, by the slave controller based on the first control signal, the cascade unit connected to the slave controller to independently perform the MPPT operation includes:

determining, by the slave controller, whether over-modulation occurs in the cascade unit connected to the slave controller; and controlling, by the slave controller, the cascade unit connected to the slave controller to independently perform the MDPT operation if over-modulation does not occur in the cascade unit connected to the slave controller, or controlling by the slave controller, the cascade unit connected to the slave controller to operate in an over-modulation protection region to perform an anti-over-modulation strategy, if over-modulation occurs in the cascade unit connected to the slave controller.

In an embodiment, the controlling, by the slave controller based on the second control signal, the cascade unit connected to the slave controller to output power includes:

calculating and allocating, by the master controller based on the anti-over-modulation strategy, a first control instruction for the slave controller; and controlling, by the slave controller in response to the first control instruction, the cascade unit connected to the slave controller to output power.

In an embodiment, the controlling, by the slave controller based on the second control signal, the cascade unit connected to the slave controller to output power includes:

calculating and allocating, by the master controller, a second control instruction for the slave controller; and controlling, by the slave controller based on an anti-over-modulation strategy in response to the second control instruction, the cascade unit connected to the slave controller to output power.

In an embodiment, the controlling, by the slave controller based on the second control signal, the cascade unit connected to the slave controller to output power includes:

calculating and allocating, by the master controller based on an anti-over-modulation strategy, a third control instruction for the slave controller; and controlling, by the slave controller based on the anti-over-modulation strategy in response to the third control instruction, the cascade unit connected to the slave controller to output power.

In an embodiment, the anti-over-modulation strategy includes:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

An apparatus for controlling an alternating current (AC) cascade photovoltaic power generation system is provided. The apparatus includes a master controller and a slave controller. The master controller includes an acquiring module, a first determining module, a generating module and a first control module. The slave controller includes a receiving module and a second control module. The acquiring module is configured to acquire a current total output power of the AC cascade photovoltaic power generation system. The first determining module is configured to determine whether the total power value is greater than a preset power value. The generating module is configured to generate a first control signal if the total power value is greater than the preset power value, or generate a second control signal if the total power value is smaller than or equal to the preset power value. The receiving module is configured to receive the first control signal or the second control signal generated by the master controller. The first control module and the second control module are configured to control, based on the first control signal, a cascade unit connected to the slave controller to independently perform a maximum power point tracking (MPPT) operation, or control, based on the second control signal, the cascade unit connected to the slave controller to output power.

In an embodiment, the second control module includes:

a first determining unit configured to determine whether over-modulation occurs in the cascade unit connected to the slave controller;

a first control unit configured to control, if over-modulation does not occur in the cascade unit connected to the slave controller, the cascade unit connected to the slave controller to independently perform the MPPT operation; and a second control unit configured to control, if over-modulation occurs in the cascade unit connected to the slave controller, the cascade unit connected to the slave controller to operate in an over-modulation protection region to perform an anti-over-modulation strategy.

In an embodiment, the first control module includes a first allocating unit. The second control module includes a third control unit. The first allocating unit is configured to calculate and allocate a first control instruction for the slave controller based on an anti-over-modulation strategy. The third control unit is configured to control, in response to the first control instruction, the cascade unit connected to the slave controller to output power.

In an embodiment, the first control module includes a second allocating unit. The second control module includes a fourth control unit. The second allocating unit is configured to calculate and allocate a second control instruction for the slave controller. The fourth control unit is configured to control, based on an anti-over-modulation strategy in response to the second control instruction, the cascade unit connected to the slave controller to output power.

In an embodiment, the first control module includes a third allocating unit. The second control module includes a fifth control unit. The third allocating unit is configured to calculate and allocate a third control instruction for the slave controller based on an anti-over-modulation strategy. The fifth control unit is configured to control, based on the anti-over-modulation strategy in response to the third control instruction, the cascade unit connected to the slave controller to output power.

In an embodiment, the anti-over-modulation strategy includes:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

As can be seen from the above technical solution that, a method for controlling an AC cascade photovoltaic power generation system is provided according to the present disclosure. First, the master controller acquires the current total output power of the AC cascade photovoltaic power generation system, and determines whether the total power value is greater than the preset power value. If the total power value is greater than the preset power value, the master controller generates the first control signal; and if the total power value is smaller than or equal to the preset power value, the master controller generates the second control signal. Then, the slave controller receives the first control signal or the second control signal generated by the master controller, and controls, based on the first control signal, the cascade unit connected to the slave controller to independently perform the MDPT operation, or controls, based on the second control signal, the cascade unit connected to the slave controller to output power. According to the present disclosure, the control is performed based on the total power outputted by the AC cascade photovoltaic power generation system, thereby solving the problem that the cascade unit may operate in an over-modulation operating condition during the operation of the AC cascade photovoltaic power generation system, and thus ensuring a normal, reliable and stable operation of the system.

BRIEF DESCRIPTION OF THE DRAWINGS

In order to more clearly describe the technical solution in the embodiments of the present disclosure or the technical solution in the conventional technology, drawings to be used in the embodiments of the present disclosure or in the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

The technical solutions in the embodiments of the present disclosure are described clearly and completely in conjunction with the accompanying drawings in the embodiments of the present disclosure hereinafter. It is apparent that the described embodiments are merely some rather than all of embodiments of the present disclosure. All other embodiments obtained by those skilled in the art based on the embodiments of the present disclosure without any creative work should fall within the protection scope of the present disclosure.

Figure 1:
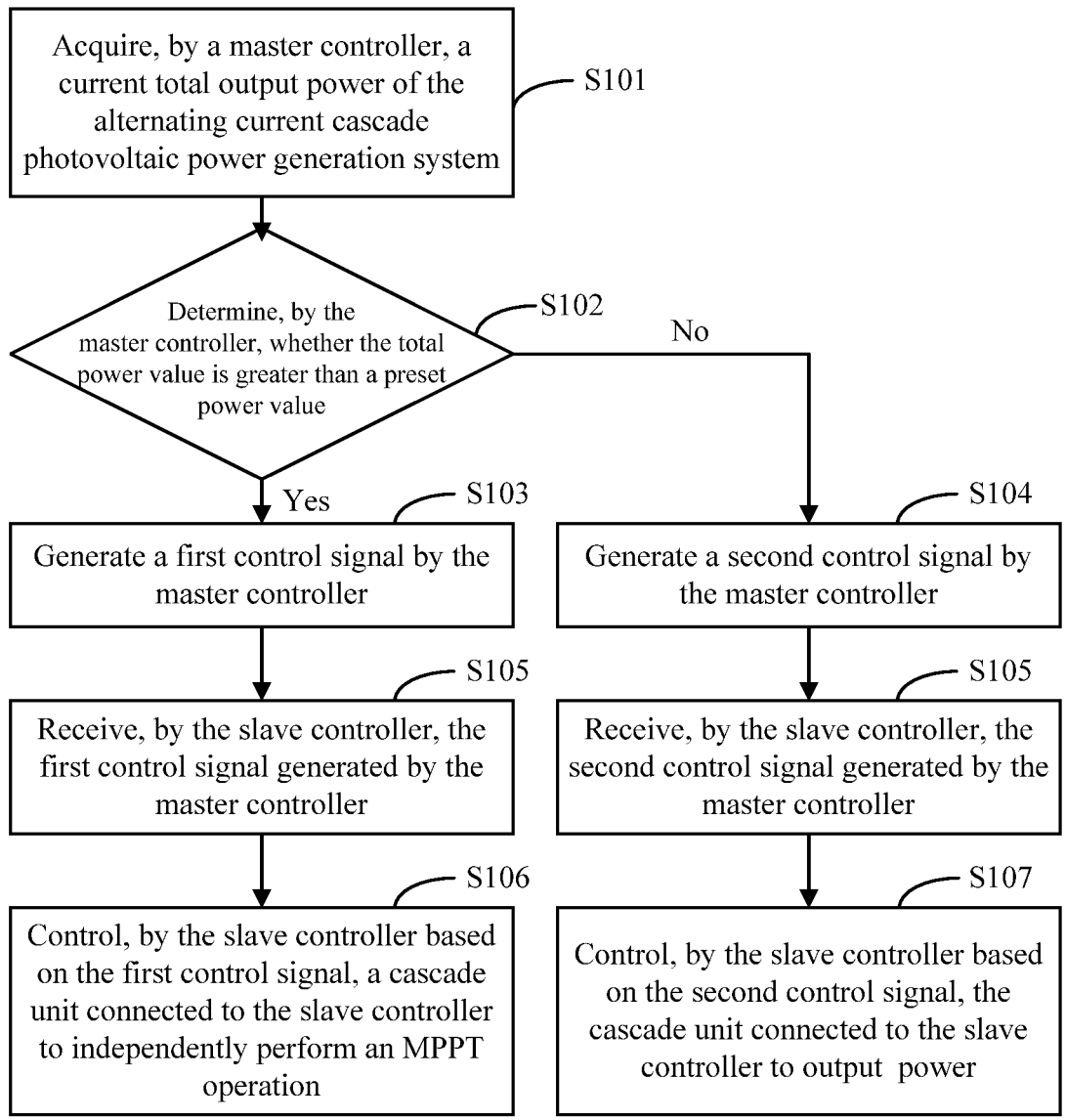
FIG. 1 is a flowchart of a first embodiment of a method for controlling an AC cascade photovoltaic power generation system according to the present disclosure.

As shown in FIG. 1, FIG. 1 is a flowchart of a first embodiment of a method for controlling an AC cascade photovoltaic power generation system according to the present disclosure. The method is applied to a control device of an AC cascade photovoltaic power generation system. The control device of the AC cascade photovoltaic power generation system includes a master controller and a slave controller. The method may include the following steps S101 to S107.

In step S101, the master controller acquires a current total output power of the AC cascade photovoltaic power generation system.

After the system is initialized, the current total output power of the AC cascade photovoltaic power generation system is acquired by the master controller.

In step S102, the master controller determines whether the total power value is greater than a preset power value. If the total power value is greater than the preset power value, the process proceeds to step S103; and if the total power value is smaller than or equal to the preset power value, the process proceeds to step S104.

After acquiring the current total output power of the AC cascade photovoltaic power generation system, the master controller determines whether the acquired total power value is greater than the preset power value. The preset power may be flexibly set according to actual needs. For example, the preset power value may be set as 10% of the total rate power.

In step S103, the master controller generates a first control signal.

In a case where the total power value is greater than the preset power value, the master controller generates the first control signal. The first control signal is used to control a cascade unit connected to a slave controller to independently perform a maximum power point tracking (MDPT) operation.

In step S104, the master controller generates a second control signal.

In a case where the total power value is smaller than or equal to the preset power value, the master controller generates the second control signal. The second control signal is an instruction for controlling each cascade unit to perform power adjustment.

In step S105, the slave controller receives the first control signal or the second control signal generated by the master controller.

In a case where the first control signal is generated by the master controller, the slave controller receives the first control signal; and in a case where the second control signal is generated by the master controller, the slave controller receives the second control signal.

In step S106, the slave controller controls the cascade unit connected to the slave controller to independently perform the MPPT operation, based on the first control signal.

In a case where the total power value is greater than the preset power value and the first control signal is generated, the cascade unit connected to the slave controller is controlled, based on the generated first control signal, to independently perform the MPPT operation.

In step S107, the slave controller controls the cascade unit connected to the slave controller to output power, based on the second control signal.

In a case where the total power value is smaller than or equal to the preset power value and the second control signal is generated, the cascade unit connected to the slave controller is controlled, based on the second control signal, to output power. The power outputted by the cascade unit connected to the slave controller is controlled, and thus it can be ensured that the cascade unit does not operate in an over-modulation region, and the cascade unit operates stably.

In summary, in the above embodiment, first, the master controller acquires the current total output power of the AC cascade photovoltaic power generation system, and determines whether the total power value is greater than the preset power value. If the total power value is greater than the preset power value, the master controller generates the first control signal; and if the total power value is smaller than or equal to the preset power value, the master controller generates the second control signal. Then, the slave controller receives the first control signal or the second control signal generated by the master controller, and controls, based on the first control signal, the cascade unit connected to the slave controller to independently perform the MPPT operation, or controls, based on the second control signal, the cascade unit connected to the slave controller to output power. According to the present disclosure, the control is performed based on the total power outputted by the AC cascade photovoltaic power generation system, thereby solving the problem that the cascade unit may operate in an over-modulation operating condition during the operation of the AC cascade photovoltaic power generation system, and thus ensuring a normal, reliable and stable operation of the system.

Figure 2:
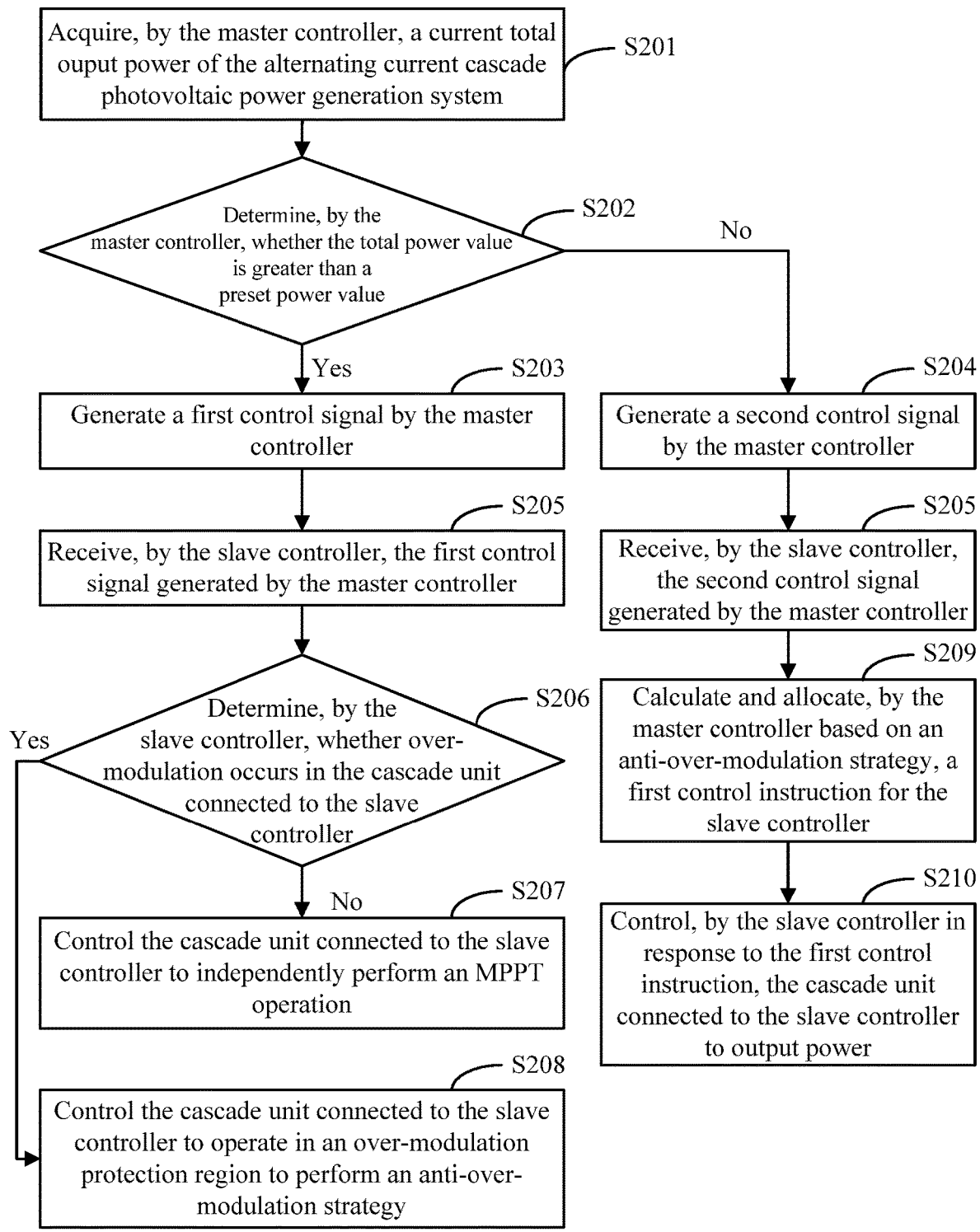
FIG. 2 is a flowchart of a second embodiment of a method for controlling an AC cascade photovoltaic power generation system according to the present disclosure.

As shown in FIG. 2, FIG. 2 is a flowchart of a second embodiment of a method for controlling an AC cascade photovoltaic power generation system according to the present disclosure. The method is applied to a control device of an AC cascade photovoltaic power generation system. The control device of the AC cascade photovoltaic power generation system includes a master controller and a slave controller. The method may include the following steps S201 to S210.

In step S201, the master controller acquires a current total output power of the AC cascade photovoltaic power generation system.

After the system is initialized, the current total output power of by the AC cascade photovoltaic power generation system is acquired by the master controller.

In step S202, the master controller determines whether the total power value is greater than a preset power value. If the total power value is greater than the preset power value, the process proceeds to step S203; and if the total power value is smaller than or equal to the preset power value, the process proceeds to step S204.

After acquiring the current total output power of the AC cascade photovoltaic power generation system, the master controller determines whether the acquired total power value is greater than the preset power value. The preset power value may be flexibly set according to actual needs. For example, the preset power value may be set as 10% of the total rate power.

In step S203, the master controller generates a first control signal.

In a case where the total power value is greater than the preset power value, the master controller generates the first control signal. The first control signal is used to control a cascade unit connected to a slave controller to independently perform a maximum power point tracking (MDPT) operation.

In step S204, the master controller generates a second control signal.

In a case where the total power value is smaller than or equal to the preset power value, the master controller generates the second control signal. The second control signal is an instruction for controlling each cascade unit to perform power adjustment.

In step S205, the slave controller receives the first control signal or the second control signal generated by the master controller.

In a case where the first control signal is generated by the master controller, the slave controller receives the first control signal; and in a case where the second control signal is generated by the master controller, the slave controller receives the second control signal.

In step S206, after the first control signal generated by the master controller is received, the slave controller determines whether over-modulation occurs in the cascade unit connected to the slave controller. If over-modulation does not occur in the cascade unit connected to the slave controller, the process proceeds to step S207; and if over-modulation occurs in the cascade unit connected to the slave controller, the process proceeds to step S208.

In a case where the total power value is greater than the preset power value and the first control signal is generated by the master controller, the slave controller receives the first control signal generated by the master controller, and determines, based on the first control signal, whether over-modulation occurs in the cascade unit connected to the slave controller.

In step S207, the cascade unit connected to the slave controller is controlled to independently perform the MDPT operation.

If over-modulation does not occur in the cascade unit connected to the slave controller, the slave controller controls the cascade unit connected to the slave controller to independently perform the MPPT operation.

In step S208, the cascade unit connected to the slave controller is controlled to operate in an over-modulation protection region to perform an anti-over-modulation strategy.

If over-modulation occurs in the cascade unit connected to the slave controller, the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In step S209, after the second control signal generated by the master controller is received by the slave controller, the maser controller calculates and allocates a first control instruction for the slave controller based on the anti-over-modulation strategy.

In a case where the total power value is smaller than or equal to the preset power value and the second control signal is generated by the master controller, the slave controller receives the second control signal generated by the master controller. The master controller calculates and allocates the first control instruction for the slave controller based on the anti-over-modulation strategy in response to the generated second control signal. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In step S210, the slave controller controls the cascade unit connected to the slave controller to output power in response to the first control instruction.

In summary, by perform collecting, operating and controlling on information such as a voltage, a current and a temperature with the master controller and the slave controller of the AC cascade photovoltaic power generation system according to the present disclosure, and with a data interaction via the communication bus, the output power of the photovoltaic panel and the output power of the AC cascade photovoltaic power generation system are controlled and a maximum output power point of the photovoltaic cell panel is tracked. In addition, according to the present disclosure, a problem of an operation failure of the system caused by the over-modulation of the cascade unit is prevented, and it is ensured that the system operates stably, safely and reliably under various complicated operating environments.

Figure 3:
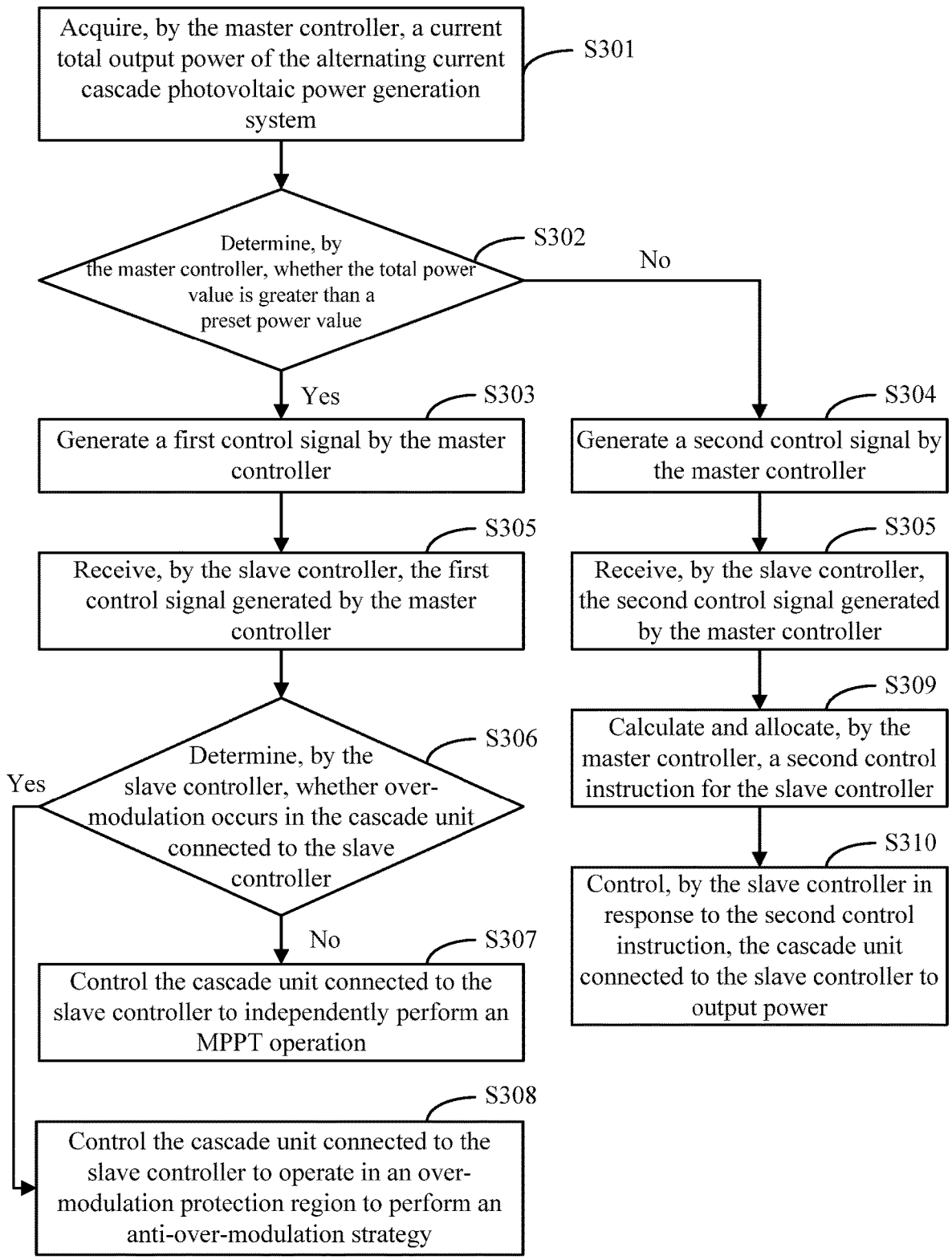
FIG. 3 is a flowchart of a third embodiment of a method for controlling an AC cascade photovoltaic power generation system according to the present disclosure.

As shown in FIG. 3, FIG. 3 is a flowchart of a third embodiment of a method for controlling an AC cascade photovoltaic power generation system according to the present disclosure. The method is applied to a control device of an AC cascade photovoltaic power generation system. The control device of the AC cascade photovoltaic power generation system includes a master controller and a slave controller. The method may include the following steps S301 to S310.

In step S301, the master controller acquires a current total output power of the AC cascade photovoltaic power generation system.

After the system is initialized, the current total output power of the AC cascade photovoltaic power generation system is acquired by the master controller.

In step S302, the master controller determines whether the total power value is greater than a preset power value. If the total power value is greater than the preset power value, the process proceeds to step S303; and if the total power value is smaller than or equal to the preset power value, the process proceeds to step S304.

After acquiring the current total output power of the AC cascade photovoltaic power generation system, the master controller determines whether the acquired total power value is greater than the preset power value. The preset power value may be flexibly set according to actual needs. For example, the preset power value may be set as 10% of the total rate power.

In step S303, the master controller generates a first control signal.

In a case where the total power value is greater than the preset power value, the master controller generates the first control signal. The first control signal is used to control a cascade unit connected to a slave controller to independently perform a maximum power point tracking (MDPT) operation.

In step S304, the master controller generates a second control signal.

In a case where the total power value is smaller than or equal to the preset power value, the master controller generates the second control signal. The second control signal is an instruction for controlling each cascade unit to perform power adjustment.

In step S305, the slave controller receives the first control signal or the second control signal generated by the master controller.

In a case where the first control signal is generated by the master controller, the slave controller receives the first control signal; and in a case where the second control signal is generated by the master controller, the slave controller receives the second control signal.

In step S306, after the first control signal generated by the master controller is received, the slave controller determines whether over-modulation occurs in the cascade unit connected to the slave controller. If over-modulation does not occur in the cascade unit connected to the slave controller, the process proceeds to step S307; and if over-modulation occurs in the cascade unit connected to the slave controller, the process proceeds to step S308.

In a case where the total power value is greater than the preset power value and the first control signal is generated by the master controller, the slave controller receives the first control signal generated by the master controller, and determines, based on the first control signal, whether over-modulation occurs in the cascade unit connected to the slave controller.

In step S307, the cascade unit connected to the slave controller is controlled to independently perform the MPPT operation.

If over-modulation does not occur in the cascade unit connected to the slave controller, the slave controller controls the cascade unit connected to the slave controller to independently perform the MPPT operation.

In step S308, the cascade unit connected to the slave controller is controlled to operate in an over-modulation protection region to perform an anti-over-modulation strategy.

If over-modulation occurs in the cascade unit connected to the slave controller, the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In step S309, after the second control signal generated by the master controller is received by the slave controller, the maser controller calculates and allocates a second control instruction for the slave controller.

In a case where the total power value is smaller than or equal to the preset power value and the second control signal is generated by the master controller, the slave controller receives the second control signal generated by the master controller, and the master controller calculates and allocates the second control instruction for the slave controller based on the generated second control signal.

In step S310, the slave controller controls the cascade unit connected to the slave controller to output power based on the anti-over-modulation strategy in response to the second control instruction.

The slave controller controls, based on the anti-over modulation strategy in response to the second control instruction generated by the master controller, the cascade unit connected to the slave controller to output power. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In summary, by performing collecting, operating and controlling on information such as a voltage, a current and a temperature with the master controller and the slave controller of the AC cascade photovoltaic power generation system according to the present disclosure, and with the data interaction via the communication bus, the output power of the photovoltaic panel and the output power of the AC cascade photovoltaic power generation system are controlled and a maximum output power point of the photovoltaic panel is tracked. In addition, according to the present disclosure, a problem of an operation failure of the system caused by the over-modulation of the cascade unit is prevented, and it is ensured that the system operates stably, safely and reliably under various complicated operating environments.

Figure 4:
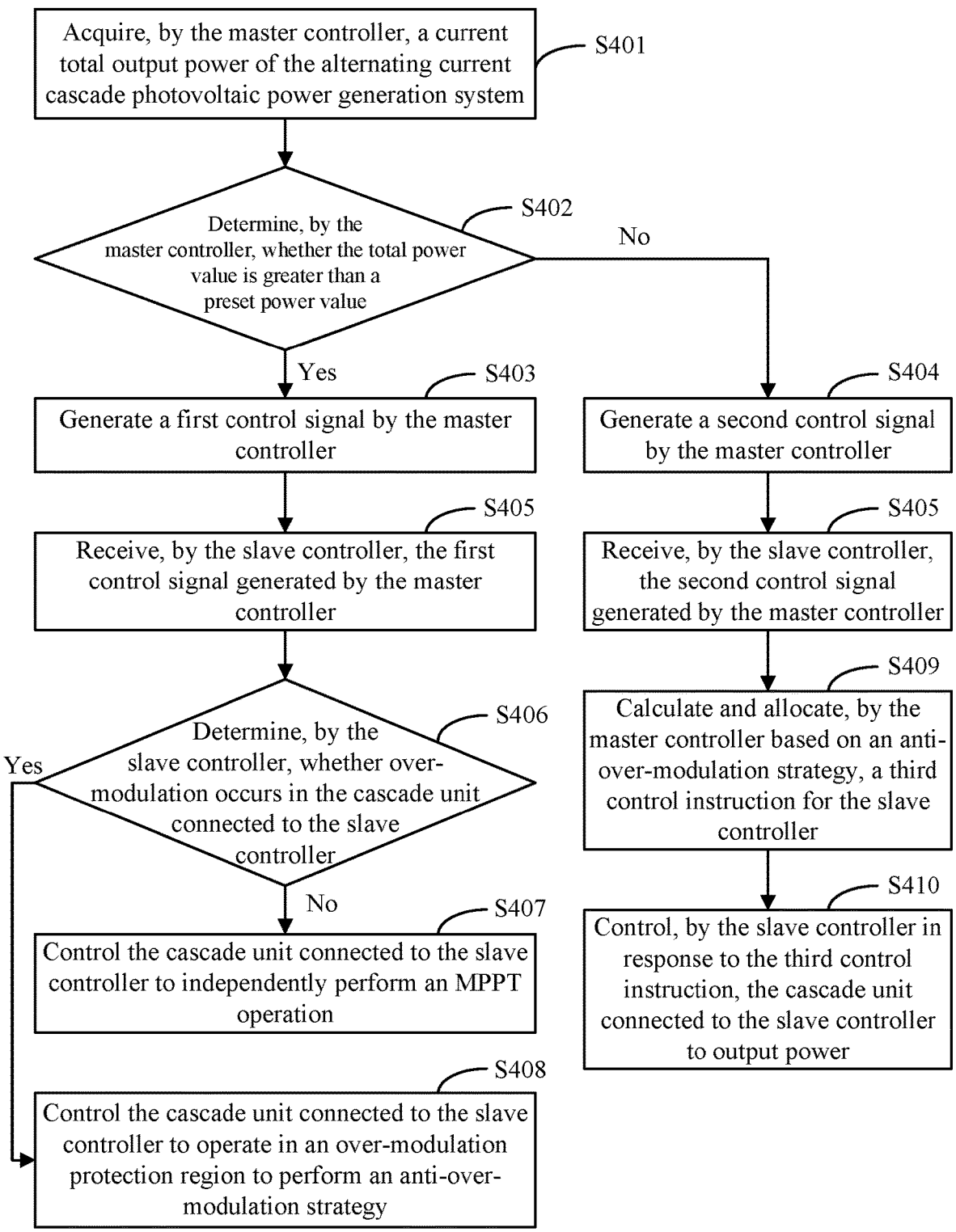
FIG. 4 is a flowchart of a fourth embodiment of a method for controlling an AC cascade photovoltaic power generation system according to the present disclosure.

As shown in FIG. 4, FIG. 4 is a flowchart of a fourth embodiment of a method for controlling an AC cascade photovoltaic power generation system according to the present disclosure. The method is applied to a control device of an AC cascade photovoltaic power generation system. The control device of the AC cascade photovoltaic power generation system includes a master controller and a slave controller. The method may include the following steps S401 to S410.

In step S401, the master controller acquires a current total output power of the AC cascade photovoltaic power generation system.

After the system is initialized, the current total output power of the AC cascade photovoltaic power generation system is acquired by the master controller.

In step S402, the master controller determines whether the total power value is greater than a preset power value. If the total power value is greater than the preset power value, the process proceeds to step S403; and if the total power value is smaller than or equal to the preset power value, the process proceeds to step S404.

After acquiring the current total output power of the AC cascade photovoltaic power generation system, the master controller determines whether the acquired total power value is greater than the preset power value. The preset power value may be flexibly set according to actual needs. For example, the preset power value may be set as 10% of the total rate power.

In step S403, the master controller generates a first control signal.

In a case where the total power value is greater than the preset power value, the master controller generates the first control signal. The first control signal is used to control a cascade unit connected to a slave controller to independently perform a maximum power point tracking (MDPT) operation.

In step S404, the master controller generates a second control signal.

In a case where the total power value is smaller than or equal to the preset power value, the master controller generates the second control signal. The second control signal is an instruction for controlling each cascade unit to perform power adjustment.

In step S405, the slave controller receives the first control signal or the second control signal generated by the master controller.

In a case where the first control signal is generated by the master controller, the slave controller receives the first control signal; and in a case where the second control signal is generated by the master controller, the slave controller receives the second control signal.

In step S406, after the first control signal generated by the master controller is received, the slave controller determines whether over-modulation occurs in the cascade unit connected to the slave controller. If over-modulation does not occur in the cascade unit connected to the slave controller, the process proceeds to step S407; and if over-modulation occurs in the cascade unit connected to the slave controller, the process proceeds to step S408.

In a case where the total power value is greater than the preset power value and the first control signal is generated by the master controller, the slave controller receives the first control signal generated by the master controller, and determines, based on the first control signal, whether over-modulation occurs in the cascade unit connected to the slave controller.

In step S407, the cascade unit connected to the slave controller is controlled to independently perform the MPPT operation.

If over-modulation does not occur in the cascade unit connected to the slave controller, the slave controller controls the cascade unit connected to the slave controller to independently perform the MPPT operation.

In step S408, the cascade unit connected to the slave controller is controlled to operate in an over-modulation protection region to perform an anti-over-modulation strategy.

If over-modulation occurs in the cascade unit connected to the slave controller, the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In step S409, after the second control signal generated by the master controller is received by the slave controller, the maser controller calculates and allocates a third control instruction for the slave controller based on the anti-over-modulation strategy.

In a case where the total power value is smaller than or equal to the preset power value and the second control signal is generated by the master controller, the slave controller receives the second control signal generated by the master controller, and the master controller calculates and allocates the third control instruction for the slave controller based on the anti-over-modulation strategy in response to the generated second control signal. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In step S410, the slave controller controls the cascade unit connected to the slave controller to output power based on the anti-over-modulation strategy in response to the third control instruction.

The slave controller controls, based on the anti-over-modulation strategy in response to the third control instruction generated by the master controller, the cascade unit connected to the slave controller to output power. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In summary, by performing collecting, operating and controlling on information such as a voltage, a current and a temperature with the master controller and the slave controller of the AC cascade photovoltaic power generation system according to the present disclosure, and with the data interaction via the communication bus, the output power of the photovoltaic panel and the output power of the AC cascade photovoltaic power generation system are controlled and a maximum output power point of the photovoltaic panel is tracked. In addition, according to the present disclosure, a problem of an operation failure of the system caused by the over-modulation of the cascade unit is prevented, and it is ensured that the system operates stably, safely and reliably under various complicated operating environments.

Figure 5:
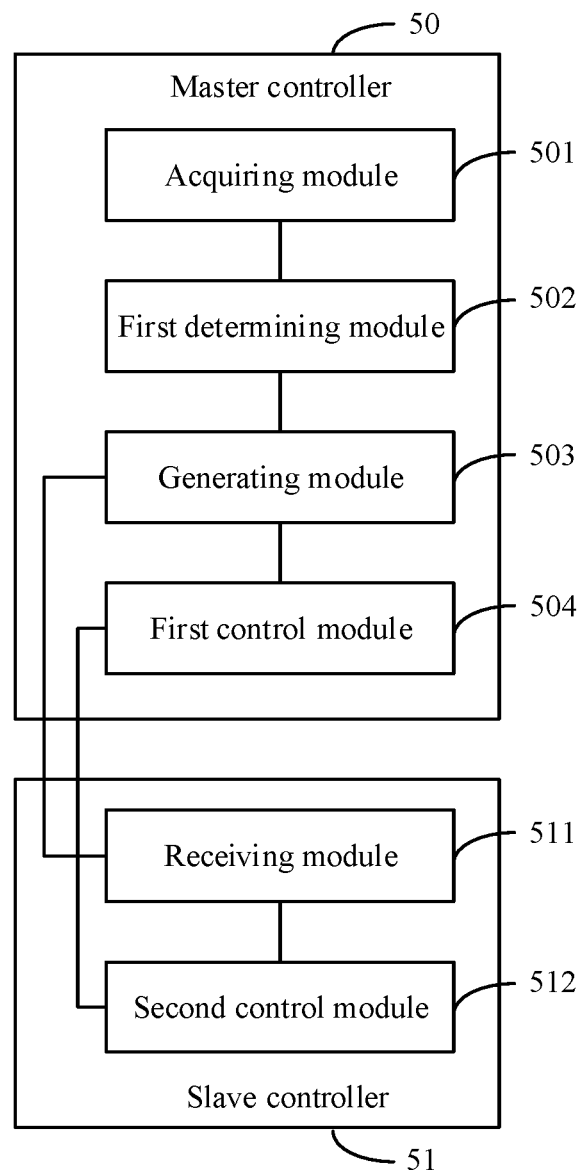
FIG. 5 is a schematic structural diagram of a first embodiment of an apparatus for controlling an AC cascade photovoltaic power generation system according to the present disclosure.

As shown in FIG. 5, FIG. 5 is a schematic structural diagram of a first embodiment of an apparatus for controlling an AC cascade photovoltaic power generation system according to the present disclosure. The apparatus includes a master controller 50 and a slave controller 51. The master controller 50 includes an acquiring module 501, a first determining module 502, a generating module 503 and a first control module 504. The slave controller 51 includes a receiving module 511 and a second control module 512.

The acquiring module 501 is configured to acquire a current total output power of the AC cascade photovoltaic power generation system.

After the system is initialized, the current total output power of the AC cascade photovoltaic power generation system is acquired by the acquiring module 501 of the master controller 50.

The first determining module 502 is configured to determine whether the total power value is greater than a preset power value.

After the current total output power of the AC cascade photovoltaic power generation system is acquired, the first determining module 502 of the master controller 50 determines whether the acquired total power value is greater than the preset power value. The preset power may be flexibly set according to actual needs. For example, the preset power may be set as 10% of the total rate power.

The generating module 503 is configured to generate a first control signal if the total power value is greater than the preset power value; or generate a second control signal if the total power value is smaller than or equal to the preset power value.

In a case where the total power value is greater than the preset power value, the first control signal is generated by the generating module 503 of the master controller 50. The first control signal is used to control a cascade unit connected to a slave controller to independently perform a maximum power point tracking (MPPT) operation.

In a case where the total power value is smaller than or equal to the preset power value, the second control signal is generated by the generating module 503 of the master controller 50. The second control signal is an instruction for controlling each cascade unit connected to the slave controller to perform power adjustment.

The receiving module 511 is configured to receive the first control signal or the second control signal generated by the master controller.

In a case where the first control signal is generated by the generating module 503 of the master controller 50, the receiving module 511 of the slave controller 51 receives the first control signal; and in a case where the second control signal is generated by the generating module 503 of the master controller 50, the receiving module 511 of the slave controller 51 receives the second control signal.

The first control module 504 and the second control module 512 are configured to control, based on the first control signal, a cascade unit connected to the slave controller to independently perform an MPPT operation, or control, based on the second control signal, the cascade unit connected to the slave controller to output power. In a case where the total power value is greater than the preset power value and the first control signal is generated, the second control module 512 controls, based on the generated first control signal, the cascade unit connected to the slave controller to independently perform the MPPT operation.

In a case where the total power value is smaller than or equal to the preset power value and the second control signal is generated, the first control module 504 and the second control module 512 are configured to control, based on the second control signal, the cascade unit connected to the slave controller to output power. The power outputted by the cascade unit connected to the slave controller is controlled, and thus it can be ensured that the cascade unit does not operate in an over-modulation region, and the cascade unit operates stably.

In summary, in the above embodiment, first, the master controller acquires the current total output power of the AC cascade photovoltaic power generation system, and determines whether the total power value is greater than the preset power value. If the total power value is greater than the preset power value, the master controller generates the first control signal; and if the total power value is smaller than or equal to the preset power value, the master controller generates the second control signal. Then, the slave controller receives the first control signal or the second control signal generated by the master controller, and controls, based on the first control signal, the cascade unit connected to the slave controller to independently perform the MPPT operation, or controls, based on the second control signal, the cascade unit connected to the slave controller to output power. According to the present disclosure, the control is performed based on the total power outputted by the AC cascade photovoltaic power generation system, thereby solving the problem that the cascade unit may operate in an over-modulation operating condition during the operation of the AC cascade photovoltaic power generation system, and thus ensuring a normal, reliable and stable operation of the system.

Figure 6:
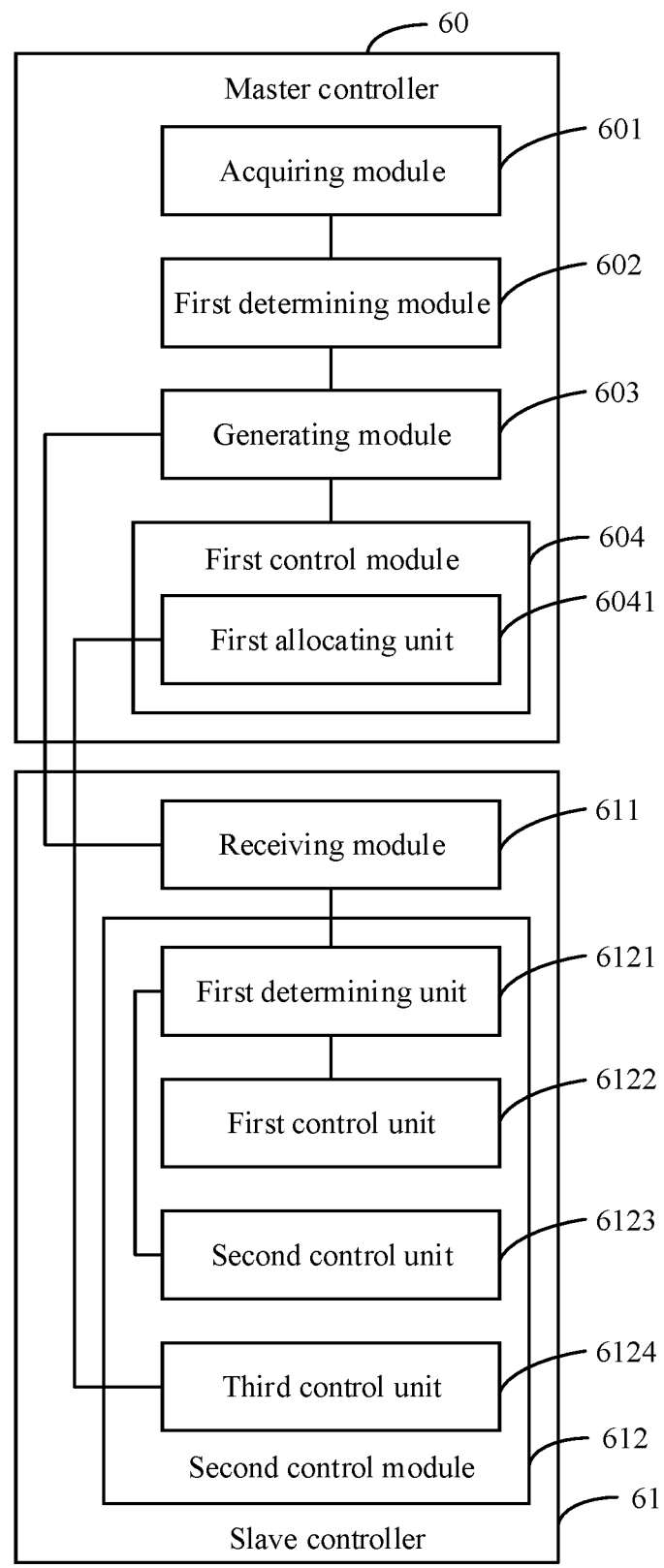
FIG. 6 is a schematic structural diagram of a second embodiment of an apparatus for controlling an AC cascade photovoltaic power generation system according to the present disclosure.

As shown in FIG. 6, FIG. 6 is a schematic structural diagram of a second embodiment of an apparatus for controlling an AC cascade photovoltaic power generation system according to the present disclosure. The apparatus includes a master controller 60 and a slave controller 61. The master controller 60 includes an acquiring module 601, a first determining module 602, a generating module 603 and a first control module 604. The slave controller 61 includes a receiving module 611 and a second control module 612. The first control module 604 includes a first allocating unit 6041. The second control module 612 includes a first determining unit 6121, a first control unit 6122, a second control unit 6123 and a third control unit 6124.

The acquiring module 601 is configured to acquire a current total output power of the AC cascade photovoltaic power generation system.

After the system is initialized, the current total output power of the AC cascade photovoltaic power generation system is acquired by the acquiring module 601 of the master controller 60.

The first determining module 602 is configured to determine whether the total power value is greater than a preset power value.

After the current total output power of the AC cascade photovoltaic power generation system is acquired, the first determining module 602 of the master controller 60 determines whether the acquired total power value is greater than the preset power value. The preset power may be flexibly set according to actual needs. For example, the preset power may be set as 10% of the total rate power.

The generating module 603 is configured to generate a first control signal if the total power value is greater than the preset power value; or generate a second control signal if the total power value is smaller than or equal to the preset power value.

In a case where the total power is greater than the preset power, the first control signal is generated by the generating module 603 of the master controller 60. The first control signal is used to control a cascade unit connected to a slave controller to independently perform a maximum power point tracking (MDPT) operation.

In a case where the total power value is smaller than or equal to the preset power value, the second control signal is generated by the generating module 603 of the master controller 60. The second control signal is an instruction for controlling each cascade unit connected to the slave controller to perform power adjustment.

The receiving module 611 is configured to receive the first control signal or the second control signal generated by the master controller.

In a case where the first control signal is generated by the generating module 603 of the master controller 60, the receiving module 611 of the slave controller 61 receives the first control signal; and in a case where the second control signal is generated by the generating module 603 of the master controller 60, the receiving module 611 of the slave controller 61 receives the second control signal.

The first determining unit 6121 is configured to determine whether over-modulation occurs in the cascade unit connected to the slave controller after the first control signal generated by the master controller is received by the slave controller.

In a case where the total power value is greater than the preset power value and the first control signal is generated by the master controller, the slave controller receives the first control signal generated by the master controller. The first determining unit 6121 of the salve controller determines, based on the first control signal, whether over-modulation occurs in the cascade unit connected to the slave controller.

The first control unit 6122 is configured to control, if over-modulation does not occur in the cascade unit connected to the slave controller, the cascade unit connected to the slave controller to independently perform the MDPT operation.

If over-modulation does not occur in the cascade unit connected to the slave controller, the first control unit 6122 of the slave controller controls the cascade unit connected to the slave controller to independently perform the MPPT operation.

The second control unit 6123 is configured to control, if over-modulation occurs in the cascade unit connected to the slave controller, the cascade unit connected to the slave controller to operate in an over-modulation protection region to perform an anti-over-modulation strategy.

If over-modulation occurs in the cascade unit connected to the slave controller, the second control unit 6123 of the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

The first allocating unit 6041 is configured to calculate and allocate a first control instruction for the slave controller based on the anti-over-modulation strategy, after the second control signal generated by the master controller is received by the slave controller.

In a case where the total power value is smaller than or equal to the preset power value and the second control signal is generated by the master controller, the slave controller receives the second control signal generated by the master controller. The first allocating unit 6041 of the master controller calculates and allocates the first control instruction for the slave controller based on the anti-over-modulation strategy in response to the generated second control signal. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

The third control unit 6124 is configured to control, in response to the first control instruction, the cascade unit connected to the slave controller to output power.

In summary, by performing collecting, operating and controlling on information such as a voltage, a current and a temperature with the master controller and the slave controller of the AC cascade photovoltaic power generation system according to the present disclosure, and with the data interaction via the communication bus, the output power of the photovoltaic panel and the output power of the AC cascade photovoltaic power generation system are controlled and a maximum output power point of the photovoltaic panel is tracked. In addition, according to the present disclosure, a problem of an operation failure of the system caused by the over-modulation of the cascade unit is prevented, and it is ensured that the system operates stably, safely and reliably under various complicated operating environments.

Figure 7:
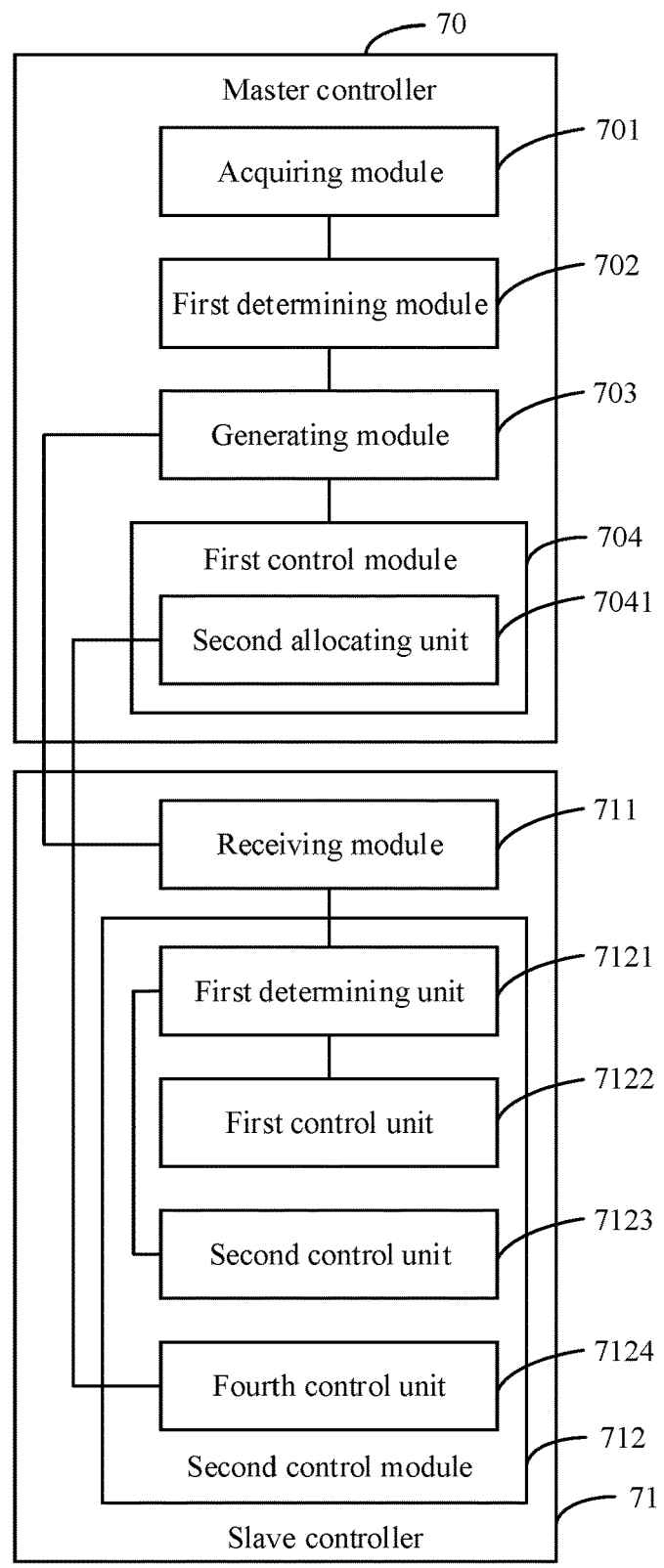
FIG. 7 is a schematic structural diagram of a third embodiment of an apparatus for controlling an AC cascade photovoltaic power generation system according to the present disclosure.

As shown in FIG. 7, FIG. 7 is a schematic structural diagram of a third embodiment of an apparatus for controlling an AC cascade photovoltaic power generation system according to the present disclosure. The apparatus includes a master controller 70 and a slave controller 71. The master controller 70 includes an acquiring module 701, a first determining module 702, a generating module 703 and a first control module 704. The slave controller 71 includes a receiving module 711 and a second control module 712. The first control module 704 includes a second allocating unit 7041. The second control module 712 includes a first determining unit 7121, a first control unit 7122, a second control unit 7123 and a fourth control unit 7124.

The acquiring module 701 is configured to acquire a current total output power of the AC cascade photovoltaic power generation system.

After the system is initialized, the current total output power of the AC cascade photovoltaic power generation system is acquired by the acquiring module 701 of the master controller 70.

The first determining module 702 is configured to determine whether the total power value is greater than a preset power value.

After the current total output power of the AC cascade photovoltaic power generation system is acquired, the first determining module 702 of the master controller 70 determines whether the acquired total power value is greater than the preset power value. The preset power may be flexibly set according to actual needs. For example, the preset power may be set as 10% of the total rate power.

The generating module 703 is configured to generate a first control signal if the total power value is greater than the preset power value; or generate a second control signal if the total power value is smaller than or equal to the preset power value.

In a case where the total power value is greater than the preset power value, the first control signal is generated by the generating module 703 of the master controller 70. The first control signal is used to control a cascade unit connected to a slave controller to independently perform a maximum power point tracking (MPPT) operation.

In a case where the total power value is smaller than or equal to the preset power value, the second control signal is generated by the generating module 703 of the master controller 70. The second control signal is an instruction for controlling each cascade unit connected to the slave controller to perform power adjustment.

The receiving module 711 is configured to receive the first control signal or the second control signal generated by the master controller.

In a case where the first control signal is generated by the generating module 703 of the master controller 70, the receiving module 711 of the slave controller 71 receives the first control signal; and in a case where the second control signal is generated by the generating module 703 of the master controller 70, the receiving module 711 of the slave controller 71 receives the second control signal.

The first determining unit 7121 is configured to determine whether over-modulation occurs in the cascade unit connected to the slave controller after the first control signal generated by the master controller is received by the slave controller.

In a case where the total power value is greater than the preset power value and the first control signal is generated by the master controller, the slave controller receives the first control signal generated by the master controller. The first determining unit 7121 of the salve controller determines, based on the first control signal, whether over-modulation occurs in the cascade unit connected to the slave controller.

The first control unit 7122 is configured to control, if over-modulation does not occur in the cascade unit connected to the slave controller, the cascade unit connected to the slave controller to independently perform the MDPT operation.

If over-modulation does not occur in the cascade unit connected to the slave controller, the first control unit 7122 of the slave controller controls the cascade unit connected to the slave controller to independently perform the MPPT operation.

The second control unit 7123 is configured to control, if over-modulation occurs in the cascade unit connected to the slave controller, the cascade unit connected to the slave controller to operate in an over-modulation protection region to perform an anti-over-modulation strategy.

If over-modulation occurs in the cascade unit connected to the slave controller, the second control unit 7123 of the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

The second allocating unit 7041 is configured to calculate and allocate a second control instruction for the slave controller after the second control signal generated by the master controller is received by the slave controller.

In a case where the total power value is smaller than or equal to the preset power value and the second control signal is generated by the master controller, the slave controller receives the second control signal generated by the master controller, and the second allocating unit 7041 of the master controller calculates and allocates the second control instruction for the slave controller based on the generated second control signal.

The fourth control unit 7124 is configured to control, based on the anti-over-modulation strategy in response to the second control instruction, the cascade unit connected to the slave controller to output power.

The fourth control unit 7124 of the slave controller controls, based on the anti-over-modulation strategy in response to the second control instruction generated by the master controller, the cascade unit connected to the slave controller to output power. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In summary, by performing collecting, operating and controlling on information such as a voltage, a current and a temperature with the master controller and the slave controller of the AC cascade photovoltaic power generation system according to the present disclosure, and with the data interaction via the communication bus, the output power of the photovoltaic panel and the output power of the AC cascade photovoltaic power generation system are controlled and a maximum output power point of the photovoltaic panel is tracked. In addition, according to the present disclosure, a problem of an operation failure of the system caused by the over-modulation of the cascade unit is prevented, and it is ensured that the system operates stably, safely and reliably under various complicated operating environments.

Figure 8:
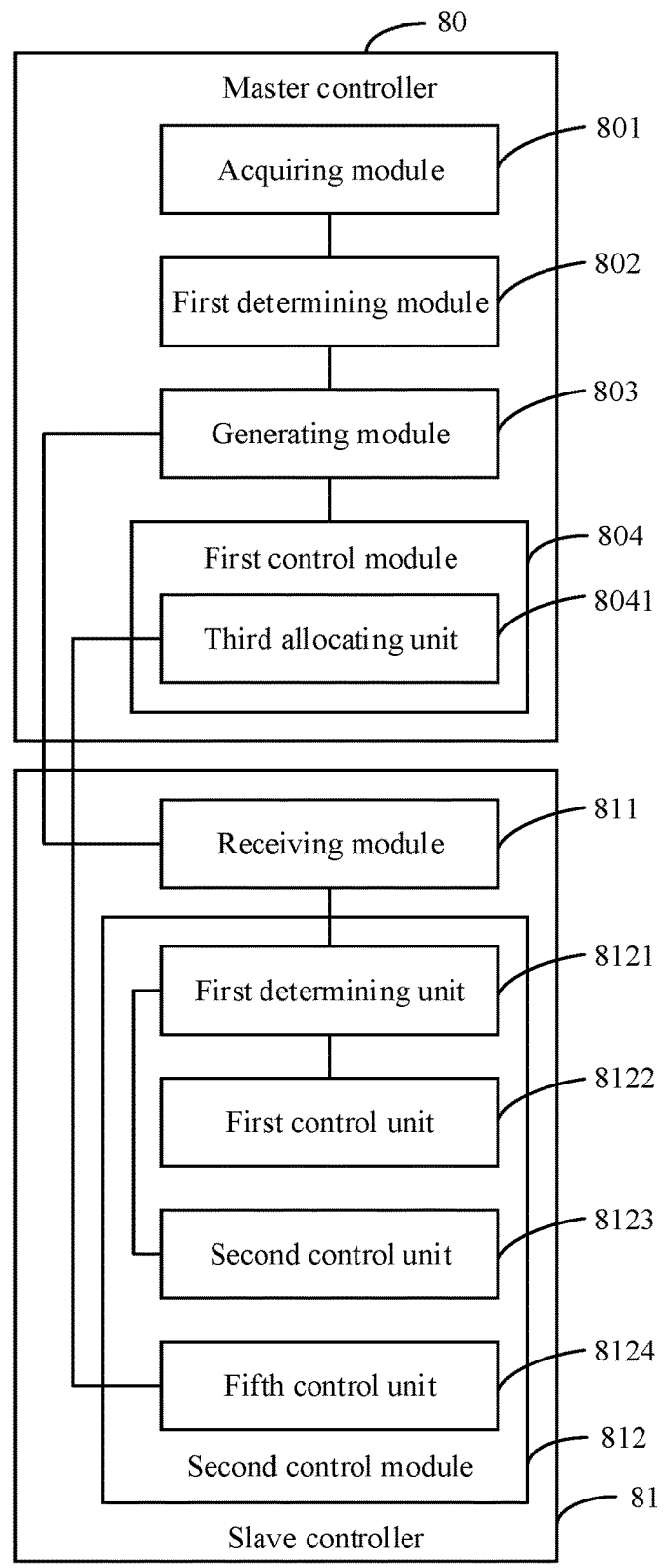
FIG. 8 is a schematic structural diagram of a fourth embodiment of an apparatus for controlling an AC cascade photovoltaic power generation system according to the present disclosure.
Figure 9:
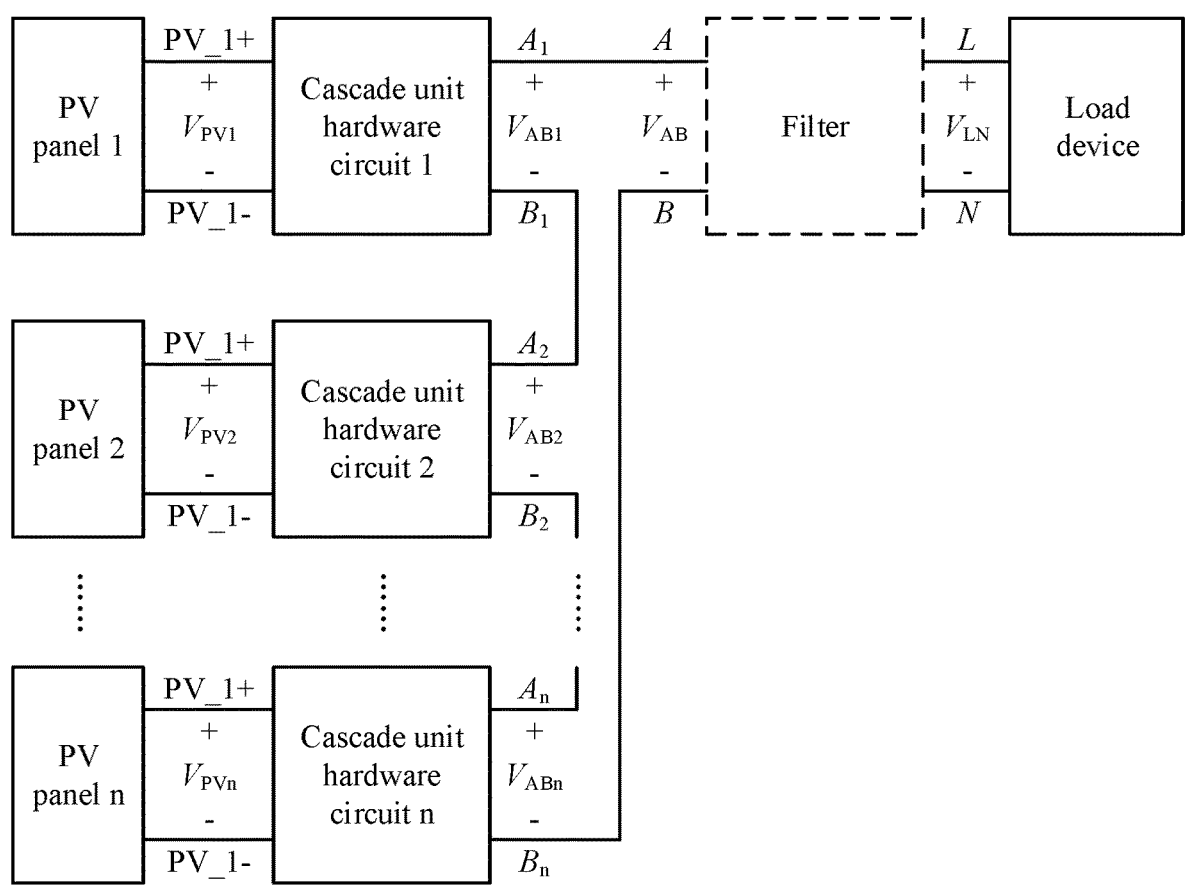
FIG. 9 is a schematic structural diagram of an AC cascade system.

As shown in FIG. 8, FIG. 8 is a schematic structural diagram of a fourth embodiment of an apparatus for controlling an AC cascade photovoltaic power generation system according to the present disclosure. The apparatus includes a master controller 80 and a slave controller 81. The master controller 80 includes an acquiring module 801, a first determining module 802, a generating module 803 and a first control module 804. The slave controller 81 includes a receiving module 811 and a second control module 812. The first control module 804 includes a third allocating unit 8041. The second control module 812 includes a first determining unit 8121, a first control unit 8122, a second control unit 8123 and a fifth control unit 8124.

The acquiring module 801 is configured to acquire a current total output power of the AC cascade photovoltaic power generation system.

After the system is initialized, the current total output power of the AC cascade photovoltaic power generation system is acquired by the acquiring module 801 of the master controller 80.

The first determining module 802 is configured to determine whether the total power value is greater than a preset power value.

After the current total output power of the AC cascade photovoltaic power generation system is acquired, the first determining module 802 of the master controller 80. determines whether the acquired total power value is greater than the preset power value. The preset power may be flexibly set according to actual needs. For example, the preset power may be set as 10% of the total rate power.

The generating module 803 is configured to generate a first control signal if the total power value is greater than the preset power value; or generate a second control signal if the total power value is smaller than or equal to the preset power value.

In a case where the total power value is greater than the preset power value, the first control signal is generated by the generating module 803 of the master controller 80. The first control signal is used to control a cascade unit connected to a slave controller to independently perform a maximum power point tracking (MPPT) operation.

In a case where the total power value is smaller than or equal to the preset power value, the second control signal is generated by the generating module 803 of the master controller 80. The second control signal is an instruction for controlling each cascade unit connected to the slave controller to perform power adjustment.

The receiving module 811 is configured to receive the first control signal or the second control signal generated by the master controller.

In a case where the first control signal is generated by the generating module 803 of the master controller 80, the receiving module 811 of the slave controller 81 receives the first control signal; and in a case where the second control signal is generated by the generating module 803 of the master controller 80, the receiving module 811 of the slave controller 81 receives the second control signal.

The first determining unit 8121 is configured to determine whether over-modulation occurs in the cascade unit connected to the slave controller after the first control signal generated by the master controller is received by the slave controller.

In a case where the total power value is greater than the preset power value and the first control signal is generated by the master controller, the slave controller receives the first control signal generated by the master controller. The first determining unit 8121 of the salve controller determines, based on the first control signal, whether over-modulation occurs in the cascade unit connected to the slave controller.

The first control unit 8122 is configured to control, if over-modulation does not occur in the cascade unit connected to the slave controller, the cascade unit connected to the slave controller to perform the MPPT operation.

If over-modulation does not occur in the cascade unit connected to the slave controller, the first control unit 8122 of the slave controller controls the cascade unit connected to the slave controller to independently perform the MPPT operation.

The second control unit 8123 is configured to control, if over-modulation occurs in the cascade unit connected to the slave controller, the cascade unit connected to the slave controller to operate in an over-modulation protection region to perform an anti-over-modulation strategy.

If over-modulation occurs in the cascade unit connected to the slave controller, the second control unit 8123 of the slave controller controls the cascade unit connected to the slave controller to operate in an over-modulation protection region to perform an anti-over-modulation strategy. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

The third allocating unit 8041 is configured to calculate and allocate a third control instruction for the slave controller based on the anti-over-modulation strategy after the second control signal generated by the master controller is received by the slave controller.

In a case where the total power value is smaller than or equal to the preset power value and the second control signal is generated by the master controller, the slave controller receives the second control signal generated by the master controller. The third allocating unit 8041 of the master controller calculates and allocates the third control instruction for the slave controller based on the anti-over-modulation strategy in response to the generated second control signal. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

The fifth control unit 8124 is configured to control, based on the anti-over-modulation strategy in response to the third control instruction, the cascade unit connected to the slave controller to output power.

The fifth control unit 8124 of the slave controller controls, based on the anti-over-modulation strategy in response to the third control instruction generated by the master controller, the cascade unit connected to the slave controller to output power. It is to be noted that the anti-over-modulation strategy may include: controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

In summary, by performing collecting, operating and controlling on information such as a voltage, a current and a temperature with the master controller and the slave controller of the AC cascade photovoltaic power generation system according to the present disclosure, and with the data interaction via the communication bus, the output power of the photovoltaic panel and the output power of the AC cascade photovoltaic power generation system are controlled and a maximum output power point of the photovoltaic panel is tracked. In addition, according to the present disclosure, a problem of an operation failure of the system caused by the over-modulation of the cascade unit is prevented, and it is ensured that the system operates the stably, safely and reliably under various complicated operating environments.

The embodiments in this specification are described in a progressive manner, and each embodiment focuses on a difference from other embodiments, and the same or similar parts among the embodiments may be referred to each other. Since the device disclosed in the embodiment corresponds to the method disclosed in the embodiment, the device is described simply, and for the related parts, one may refer to the description of the method.

Those skilled in the art may further realize that the units and algorithm steps of the examples described in the embodiments disclosed herein can be implemented by electronic hardware, computer software, or a combination thereof. To clearly describe interchangeability between hardware and software, the modules and steps of each example have been generally described in terms of their functionality in the above description. Whether these functions are implemented by hardware or software depends on the specific application and design constraints of the technical solutions. A person skilled in the art may use different methods to implement the described functions for each particular application, but such implementation should not be considered to go beyond the scope of the present disclosure.

The steps of the method or the algorithm described according to the embodiments disclosed herein may be implemented in forms of hardware, a software module executed by a processor or the combination thereof. The software module may be stored in a random access memory (RAM), a memory, a read-only memory (ROM), an electrically programmable ROM, an electrically erasable programmable ROM, a register, a hard disk, a movable magnetic disk, CD-ROM or any other forms of storage medium well known in the conventional technology.

The above description of the disclosed embodiments enables those skilled in the art to implement or use the present disclosure. Various modifications to these embodiments are readily apparent to those skilled in the art, and the general principles defined herein may be implemented in other embodiments without departing from the spirit or scope of the disclosure. Therefore, the present disclosure is not limited to the embodiments shown herein, but should conform to the widest scope consistent with the principles and novel features disclosed herein.

The invention claimed is:

1. A method for controlling an alternating current cascade photovoltaic power generation system, wherein the method is applied to a control device of an alternating current cascade photovoltaic power generation system, the control device of the alternating current cascade photovoltaic power generation system comprises a master controller and a slave controller, and the method comprises:
   acquiring, by the master controller, a current total output power of the alternating current cascade photovoltaic power generation system;
   determining, by the master controller, whether the total power value is greater than a preset power value, generating, by the master controller, a first control signal if the total power value is greater than the preset power value, and generating, by the master controller, a second control signal if the total power value is smaller than or equal to the preset power value;
   receiving, by the slave controller, the first control signal or the second control signal generated by the master controller; and
   controlling, by the slave controller based on the first control signal, a cascade unit connected to the slave controller to independently perform a maximum power point tracking (MPPT) operation, or controlling, by the slave controller based on the second control signal, the cascade unit connected to the slave controller to output power.

2. The method according to claim 1, wherein the controlling, by the slave controller based on the first control signal, the cascade unit connected to the slave controller to independently perform the MPPT operation comprises:
   determining, by the slave controller, whether over-modulation occurs in the cascade unit connected to the slave controller; and
   controlling, by the slave controller, the cascade unit connected to the slave controller to independently perform the MPPT operation if over-modulation does not occur in the cascade unit connected to the slave controller, or controlling, by the slave controller, the cascade unit connected to the slave controller to operate in an over-modulation protection region to perform an anti-over-modulation strategy, if over-modulation occurs in the cascade unit connected to the slave controller.

3. The method according to claim 1, wherein the controlling, by the slave controller based on the second control signal, the cascade unit connected to the slave controller to output power comprises:
   calculating and allocating, by the master controller based on an anti-over-modulation strategy, a first control instruction for the slave controller; and
   controlling, by the slave controller in response to the first control instruction, the cascade unit connected to the slave controller to output power.

4. The method according to claim 1, wherein the controlling, by the slave controller based on the second control signal, the cascade unit connected to the slave controller to output power comprises:
   calculating and allocating, by the master controller, a second control instruction for the slave controller; and
   controlling, by the slave controller based on an anti-over-modulation strategy in response to the second control instruction, the cascade unit connected to the slave controller to output power.

5. The method according to claim 1, wherein the controlling, by the slave controller based on the second control signal, the cascade unit connected to the slave controller to output power comprises:
   calculating and allocating, by the master controller based on an anti-over-modulation strategy, a third control instruction for the slave controller; and
   controlling, by the slave controller based on the anti-over-modulation strategy in response to the third control instruction, the cascade unit connected to the slave controller to output power.

6. The method according to claim 2, wherein the anti-over-modulation strategy comprises:
   controlling an output power value of the cascade unit connected to the slave controller to be smaller than or equal to an output power value corresponding to a maximum modulation limit value; or
   controlling an input voltage of the cascade unit connected to the slave controller to be greater than or equal to an input voltage corresponding to the maximum modulation limit value.

7. The method according to claim 3, wherein the anti-over-modulation strategy comprises:
   controlling an output power value of the cascade unit connected to the slave controller to be smaller than or equal to an output power value corresponding to a maximum modulation limit value; or
   controlling an input voltage of the cascade unit connected to the slave controller to be greater than or equal to an input voltage corresponding to the maximum modulation limit value.

8. The method according to claim 4, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

9. The method according to claim 5, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

10. An apparatus for controlling an alternating current cascade photovoltaic power generation system, wherein the apparatus comprises a master controller and a slave controller, the master controller comprises an acquiring module, a first determining module, a generating module and a first control module, and the slave controller comprises a receiving module and a second control module, and wherein:

the acquiring module is configured to acquire a current total output power of the alternating current cascade photovoltaic power generation system;

the first determining module is configured to determine whether the total power value is greater than a preset power value;

the generating module is configured to generate a first control signal if the total power value is greater than the preset power value, or generate a second control signal if the total power value is smaller than or equal to the preset power value;

the receiving module is configured to receive the first control signal or the second control signal generated by the master controller; and the first control module and the second control module are configured to control, based on the first control signal, a cascade unit connected to the slave controller to independently perform a maximum power point tracking (MPPT) operation, or control, based on the second control signal, the cascade unit connected to the slave controller to output power.

11. The apparatus according to claim 10, wherein the second control module comprises:

a first determining unit configured to determine whether over-modulation occurs in the cascade unit connected to the slave controller;

a first control unit configured to control, if over-modulation does not occur in the cascade unit connected to the slave controller, the cascade unit connected to the slave controller to independently perform the MPPT operation; and a second control unit configured to control, if over-modulation occurs in the cascade unit connected to the slave controller, the cascade unit connected to the slave controller to operate in an over-modulation protection region to perform an anti-over-modulation strategy.

12. The apparatus according to claim 10, wherein the first control module comprises a first allocating unit, the second control module comprises a third control unit, and wherein:

the first allocating unit is configured to calculate and allocate a first control instruction for the slave controller based on an anti-over-modulation strategy; and the third control unit is configured to control, in response to the first control instruction, the cascade unit connected to the slave controller to output power.

13. The apparatus according to claim 10, wherein the first control module comprises a second allocating unit, the second control module comprises a fourth control unit, and wherein:

the second allocating unit is configured to calculate and allocate a second control instruction for the slave controller based on an anti-over-modulation strategy; and the fourth control unit is configured to control, based on the anti-over-modulation strategy in response to the second control instruction, the cascade unit connected to the slave controller to output power.

14. The apparatus according to claim 10, wherein the first control module comprises a third allocating unit, the second control module comprises a fifth control unit, and wherein:

the third allocating unit is configured to calculate and allocate a third control instruction for the slave controller based on an anti-over-modulation strategy; and the fifth control unit is configured to control, based on the anti-over-modulation strategy in response to the third control instruction, the cascade unit connected to the slave controller to output power.

15. The apparatus according to claim 11, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

16. The apparatus according to claim 12, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

17. The apparatus according to claim 13, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

18. The apparatus according to claim 14, wherein the anti-over-modulation strategy comprises:

controlling an output power value of the cascade unit connected to the slave controller to be smaller than or equal to an output power value corresponding to a maximum modulation limit value; or controlling an input voltage of the cascade unit connected to the slave controller to be greater than or equal to an input voltage corresponding to the maximum modulation limit value.

* * * * *